(No Model.) 2 Sheets—Sheet 2.
F. BATEMAN.
WHEEL CULTIVATOR.
No. 472,781. Patented Apr. 12, 1892.
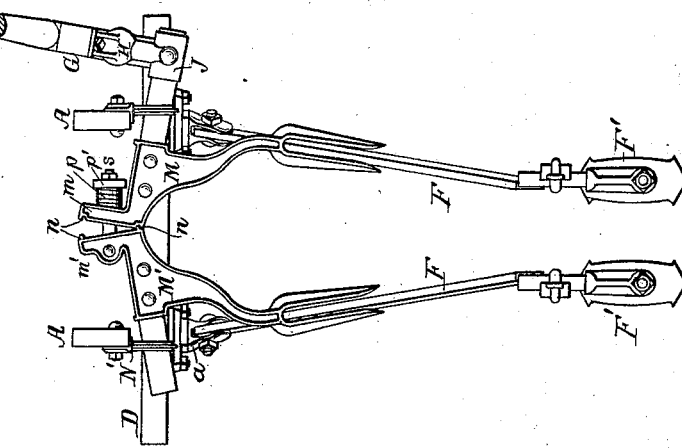
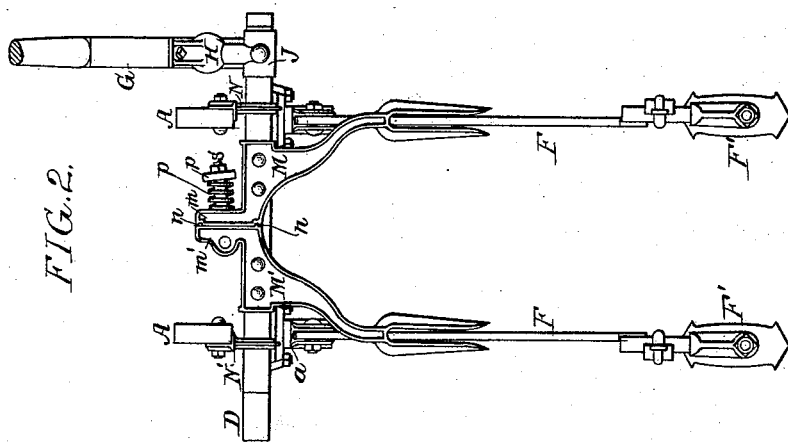
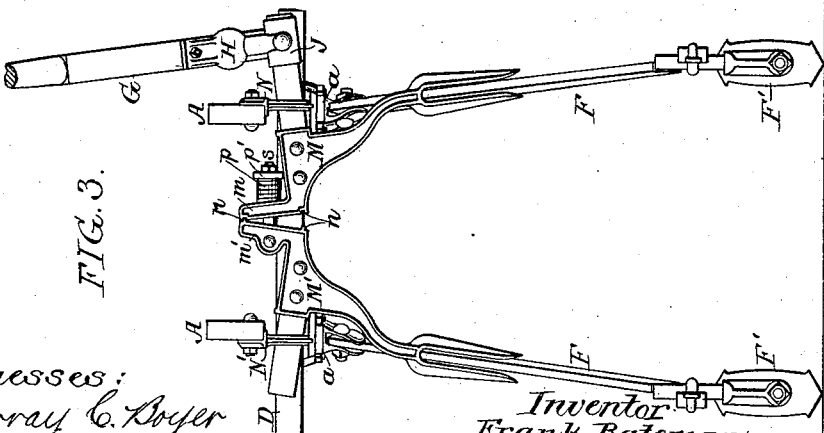

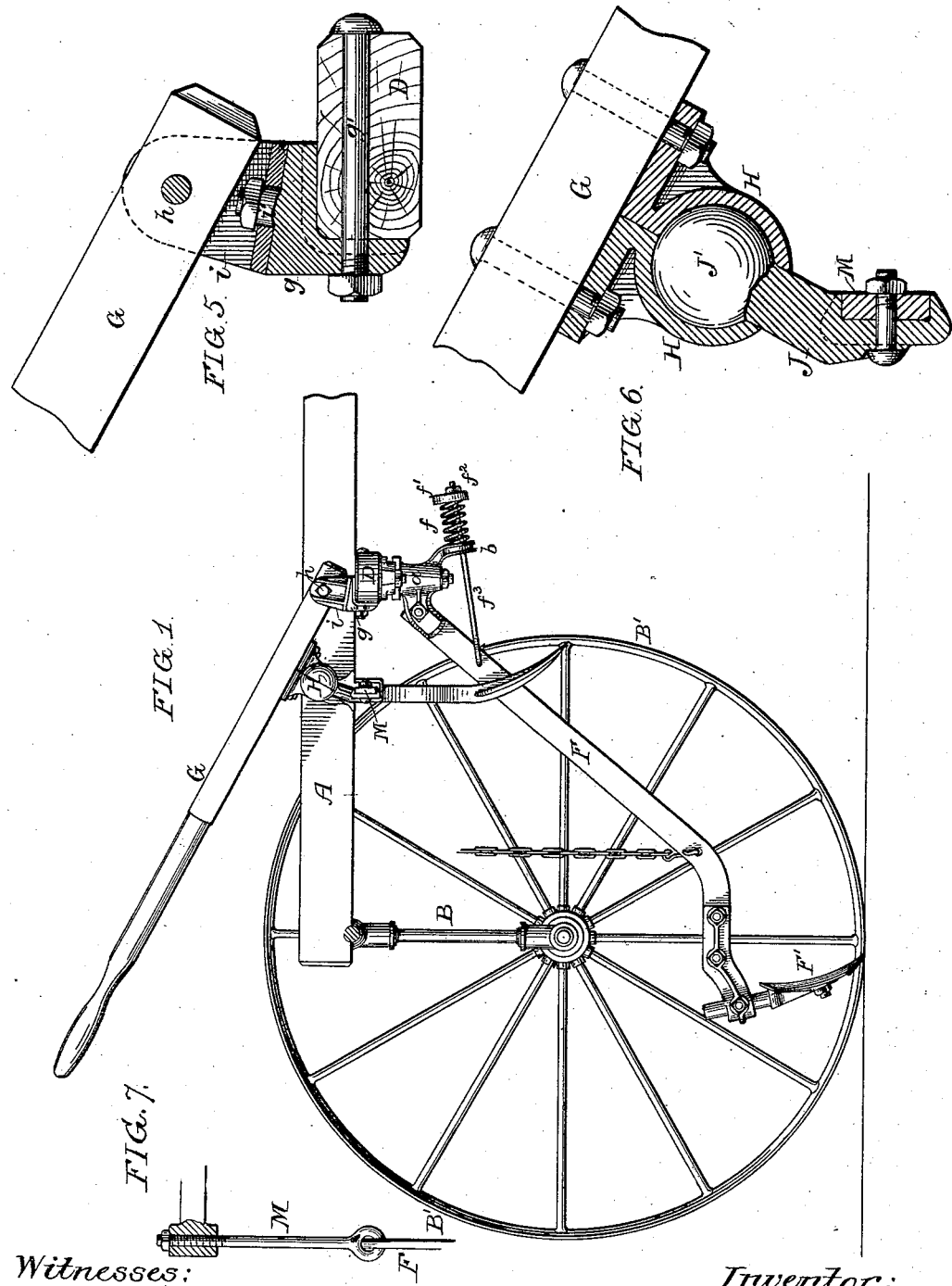

United States Patent Office.

FRANK BATEMAN, OF GRENLOCH, NEW JERSEY, ASSIGNOR TO HIMSELF AND EDWARD S. BATEMAN, OF SAME PLACE, AND EDGAR C. WILSON, OF BLACKWOOD, NEW JERSEY.

WHEEL-CULTIVATOR.

SPECIFICATION forming part of Letters Patent No. 472,781, dated April 12, 1892.

Application filed August 4, 1891. Serial No. 401,698. (No model.)

*To all whom it may concern:*

Be it known that I, FRANK BATEMAN, a citizen of the United States, and a resident of Grenloch, Camden county, New Jersey, have invented certain Improvements in Wheel-Cultivators, of which the following is a specification.

My invention consists of mechanism whereby the attendant in charge of a wheel-cultivator can readily and with one hand move to right or left the central pair of cultivator-blades to accommodate any irregularity in the line of the row of plants which is being cultivated, or can, if desired, effect a movement of said blades from or toward each other.

In the accompanying drawings, Figure 1 is a side elevation of so much of a wheel-cultivator as is necessary to illustrate my invention, the arched axle of the cultivator being shown in section. Figs. 2, 3, and 4 are transverse sections, also showing in elevation parts to which my invention relates, these parts being shown in different positions in the different views. Fig. 5 is a longitudinal sectional view, on an enlarged scale, of the hanger for the operating-lever. Fig. 6 is a cross-section, on an enlarged scale, of one of the attachments of said lever; and Fig. 7 is a view illustrating a modification of one of the parts of the machine.

I may state at the outset that I have not shown in the drawings the opposite side blades with which wheel-cultivators are usually provided, as my invention has no reference thereto, but only to the central pair of blades, which usually work close to the row which is being cultivated and which must have some provision for moving them to right or left in order to avoid plants which may be out of the main line of the row in one direction or the other. I therefore provide the machine with means whereby the manipulation of a single lever by the attendant is sufficient to cause the central pair of blades to move to right or left, the blades being also caused to approach or recede from each other, if desired, so that they can be readily caused to avoid any misplaced plants in the row and work close to the plants, whether the latter are wide or narrow.

In Figs. 1 to 4, A represents the main longitudinal beams of the cultivator-frame, these beams carrying at their rear ends the arched axle B, upon the opposite ends of which are mounted the wheels B' of the cultivator. To the under side of these longitudinal beams A is secured a transverse beam D, and to swiveled heads $a$, depending from this beam, are hung the bars F, which carry the central cultivator-blades F', the usual provision being made for the raising and lowering of these blades. While any ordinary form of swiveled head may be used for this purpose, the head $a$ which I employ has a special feature of construction—namely, a depending arm $b$, which serves as a bearing for the rear end of a spring $f$, the other end of which acts upon a cap or collar $f'$, confined by a nut $f^2$ to the front end of a rod $f^3$, the rear end of which is hooked onto the bar F, so that the spring tends to depress said bar and keep the blade F' properly in action, the spring mechanism being thus carried wholly by the swiveled head $a$, so as to move with the latter.

Secured to the transverse bar D by means of a bolt $g'$ is a bracket $g$, Fig. 5, and swiveled upon the latter by means of a bolt $i'$ is a bracket $i$, carrying the pivot-pin $h$ for an operating lever or handle G, which can thus swing universally, owing to the fact that the pivot-pin $h$ and swivel-bolt $i'$ are in planes at right angles to each other.

On the under side of the operating-lever G is a cap H, made in two parts, so as to inclose the spherical head J' of a bracket J, secured to one arm of a bell-crank lever M, which is hung and is free to slide laterally in a hanger-loop N, secured to one of the longitudinal beams A of the frame, the other and depending arm of this lever M being forked, so as to embrace the hanger-bar F of one of the blades F'. A precisely similar lever M', hung to and free to slide in a hanger-loop N' on the other longitudinal beam of the frame, is employed in connection with the hanger-bar of the other cultivator-blade, and the inner ends of these levers M M' meet and are provided with enlarged bearing-heads $m\ m'$, respectively, these bearing-heads having at top and bottom engaging teeth and recesses $n$ and being normally held in contact with each other, as shown in Fig. 2, by means of a spring $p$, interposed between the head $m$ and a collar $p'$ on a bolt $s$, which is hung to the head $m'$ and passes through an opening in the head $m$.

When the parts are in their normal position, (shown in Fig. 2,) the cultivator-blades $F'$ occupy their proper position in relation to each other to cultivate a straight row; but by moving the lever G to right or left the blades $F'$ can be likewise moved to right or left, the levers M M' sliding in the hangers N N', so that the blades will clear misplaced plants, and if it is desired to separate the blades this can be effected by raising the lever G, as shown in Fig. 3, thereby causing upward movement of the outer end of the upper arm of the lever M and a downward movement of the inner end of the same, and this movement being transmitted from the head $m$ of the lever M to the head $m'$ of the lever M', so as to cause outward movement of the forked depending arms of both levers, thus effecting the desired separation of the blades, the upper tooth and notch of the heads $m\ m'$ remaining in engagement, as shown in Fig. 3.

If it is desired to cause the blades F F' to approach each other, such movement is effected by depressing the lever G, as shown in Fig. 4, such movement causing an operation of the levers M M', which is the reverse of that shown in Fig. 3, the lower tooth and recess of the heads $m\ m'$ remaining in engagement, as shown in said Fig. 4.

It will be noticed that the engaging lugs and recesses of the heads $m\ m'$ of the two levers M M' simply constitute a toothed connection between the two levers, and any desired form of such connection may be used, as required, the function of this feature of construction being simply to cause joint and simultaneous movement of both levers when power is applied to one of them.

A rod $M^2$, hung to the bar F and engaging with the lever M or M', as shown in Fig. 7, may be used, if desired, in place of the forked arm of said lever.

Having thus described my invention, I claim and desire to secure by Letters Patent—

1. The combination of the hanger-bars of a pair of cultivator-blades, with arms having a bearing upon each other and free to slide laterally in hangers on the frame and having portions engaging said hanger-bars, and a single operating-lever for imparting lateral movement in both directions to said arms, substantially as specified.

2. The combination of the hanger-bars of a pair of cultivator-blades, with a pair of controlling-levers free to slide laterally and engaging with each other at their meeting-points and having arms for engaging with said hanger-bars so as to move said bars from or toward each other, and a lever-handle connected to one of said controlling-levers, substantially as specified.

3. The combination of the hanger-bars of a pair of cultivator-blades, a pair of controlling-levers engaging with each other at their meeting-points and having arms for engaging with said hanger-bars, a spring for holding the levers in engagement at their meeting-points, and a lever-handle connected to one of said controlling-levers, substantially as specified.

4. The combination of the hanger-bars of a pair of cultivator-blades, a pair of controlling-levers engaging with said bars and having toothed and recessed heads whereby they are caused to engage with each other at their meeting-points, a spring for holding said levers in engagement, and a lever-handle for operating one of said controlling-levers, substantially as specified.

5. The combination of the hanger-bars of a pair of cultivator-blades, a pair of levers engaging with said bars and also in engagement with each other at their meeting-points, a lever-handle for operating one of said controlling-levers, a universal hanger for said lever-handle, and a universal connection between the same and the controlling-lever, substantially as specified.

6. The combination of the hanger-bar of a cultivator-blade, a head to which said bar is pivoted and which has a depending arm, a rod connected to the hanger-bar and passing through said arm and having a bearing-collar beyond the same, and a spring interposed between said arm and collar, substantially as specified.

7. The combination of the hanger-bars of a pair of cultivator-blades, a pair of connected levers engaging said bars and mounted in hangers in which they are free to slide laterally, and a lever-handle connected to one of said levers and mounted so as to swing upward, downward, and sidewise, substantially as specified.

8. The combination of the hanger-bars of a pair of cultivator-blades, a pair of levers engaging the same, but having a lost-motion connection with said bars, and means for moving said levers so as to cause lateral movement of the bars and blades, substantially as specified.

In testimony whereof I have signed my name to this specification in the presence of two subscribing witnesses.

FRANK BATEMAN.

Witnesses:
  WILLIAM D. CONNÉR,
  HARRY SMITH.